United States Patent [19]

Miller

[11] 3,771,973
[45] Nov. 13, 1973

[54] METAL PLATING OF SYNTHETIC POLYMERS

[75] Inventor: George T. Miller, Lewiston, N.Y.

[73] Assignee: Hooker Chemical Corporation, Niagara Falls, N.Y.

[22] Filed: May 10, 1971

[21] Appl. No.: 142,053

Related U.S. Application Data

[63] Continuation-in-part of Ser. Nos. 614,541, Feb. 8, 1967, and Ser. No. 847,423, Aug. 4, 1969, which is a continuation-in-part of Ser. No. 683,793, Nov. 17, 1967, abandoned, which is a continuation-in-part of Ser. No. 614,541, Feb. 8, 1967.

[52] U.S. Cl. 29/195, 29/196.3, 29/196.6, 106/1, 117/47 A, 204/30, 204/38 B
[51] Int. Cl. C23f 17/00, C23b 5/60
[58] Field of Search 117/71 R, 62.1, 47 A, 117/47 R, 160 R; 204/30, 38 B; 106/1; 29/195, 196.3, 196.6

[56] References Cited
UNITED STATES PATENTS 3,235,473  2/1966  Le Duc ............................. 204/30
3,282,737  11/1966  Hinterman et al. ............... 136/120

OTHER PUBLICATIONS

"Electrodeposition on Plastic Materials" by Bayard Metal Industry, May 1940, pp. 255–256, 259.

"Electrodeposition of Metals" Langbein et al., 9th Ed., 1924, pp. 766–769.

Mellor, "A Comprehensive Treatise on Inorganic Chemistry" Vol. 111, p. 317, (1928).

Handbook of Chemistry & Physics, 4th Ed., 1965–1966, p. B202.

*Primary Examiner*—John H. Mack
*Assistant Examiner*—R. L. Andrews
*Attorney*—Peter F. Casella, Donald C. Studley, Richard P. Mueller and James F. Mudd

[57] ABSTRACT

Synthetic polymers, having a non-macroporous surface, are plated with metals by pretreating the non-macroporous polymer surface with phosphorus in an organic solvent to deposit phosphorus at the polymer surface. The treated surface is then contacted with a metal salt or metal salt complex, to form a metal-phosphorus compound. The resulting surface is then either conductive or is capable of catalyzing the reduction of a metal salt to form a conductive surface. The resulting surfaces are readily electroplated by conventional techniques.

22 Claims, No Drawings

METAL PLATING OF SYNTHETIC POLYMERS

This is a continuation-in-part of copending application Ser. No. 614,541, filed Feb. 8, 1967 and copending application Ser. No. 847,423, filed Aug. 4, 1969, which latter application is a continuation-in-part of Ser. No. 683,793, filed Nov. 17, 1967 and now abandoned, which latter application is also a continuation-in-part of Ser. No. 614,541, filed Feb. 8, 1967.

This invention relates to an improved process for the metal plating of synthetic polymers and more particularly it relates to an improved process for treating non-macroporous synthetic polymer surfaces to render them capable of being electroplated with an adherent metal plate.

In recent years, there has been an increase in the use of synthetic polymer materials for many applications which have heretofore utilized metallic components. In many of these applications, it has been found to be desirable that the synthetic polymer materials be electroplated with metal, either for decorative purposes or for some functional attribute imparted by the metal plate. The automotive, electronic, and appliance industries are illustrative of those in which there has been an increasing utilization of such plated synthetic polymers.

Although processes for the treatment of non-conductive surfaces to make them suitable for electroplating are quite old, because the nature of the surfaces treated in these old processes, such as leather, fabrics, feathers, and the like, are significantly different from the nature of the synthetic polymer surfaces, attempts to utilize these old processes on synthetic polymers have not been successful. Almost without exception, it has been found that where these old processes have been tried with synthetic polymer surfaces, an adherent metal plate cannot be obtained unless the polymer surface is first subjected to a chemical or physical etching to form a macroporous surface which provides bonding sites for the subsequently applied metal layer. Accordingly, the processes which have presently been proposed for commercialization have all involved a multiplicity of process steps, including the chemical or mechanical pre-etch. Additionally, each of such processes have generally been satisfactory with only one or perhaps a few related, synthetic polymers.

It is, therefore, an object of the present invention to provide a simple process for the metal plating of synthetic polymer surfaces.

Another object of the present invention is to provide an improved process for the metal plating of synthetic polymer surfaces, which process is applicable to a wide variety of synthetic polymers A further object of the present invention is to provide a synthetic polymer article having an adherent metal coating, which coating is resistant to peeling, temperature cycling, and corrosion.

These and other objects will become apparent to those skilled in the art from the description of the invention which follows.

Pursuant to the above objects, the present invention includes a process for the treatment of a synthetic polymer surface which comprises contacting a non-macroporous synthetic polymer surface with white phosphorus in an organic solvent, which is capable of swelling the surface of the polymer without detrimentally affecting it, so as to deposit phosphorus at said polymer surface, contacting the thus-treated surface with a solution consisting essentially of a metal salt or metal salt complex, so as to form a metal phosphide, wherein said metal is selected from Groups IB, IIB, IVB, VB, VIB, VIIB, and VIII of the Periodic Table, and thereafter, electroplating the resulting surface to deposit an adherent metal coating on the treated polymer surface.

More specifically, in the practice of the present invention, typical synthetic polymer surfaces to which the process of the invention is applicable include the homopolymers and copolymers of ethyleneically unsaturated aliphatic, alicyclic and aromatic hydrocarbons such as polyethylene, polypropylene, polybutene, ethylenepropylene copolymers; copolymers of ethylene or propylene with other olefins, polybutadiene; polymers of butadiene, polyisoprene, both natural and synthetic, polystyrene and polymers of pentene, hexene, heptene, octene, 2-methylpropene, 4-methyl-hexene-1, bicyclo-(2.2.1)-2-heptene, pentadiene, hexadiene, 2,3-dimethylbutadiene-1,3,4-vinylcyclohexene, cyclopentadiene, methylstyrene, and the like. Other polymers useful in the invention include polyindene, indenecoumarone resins; polymers of acrylate esters and polymers of methacrylate esters, acrylate and methacrylate resins such as ethyl acrylate, n-butyl methacrylate, isobutyl methacrylate, ethyl methacrylate and methyl methacrylate; alkyd resins; cellulose derivates such as cellulose acetate, cellulose acetate butyrate, cellulose nitrate, ethyl cellulose, hydroxyethyl cellulose, methyl cellulose and sodium carboxymethyl cellulose; epoxy resins; furan resins (furfuryl alcohol or furfuralketone); hydrocarbon resins from petroleum; isobutylene resins (polyisobutylene); isocyanate resins (polyurethanes); melamine resins such as melamine-formaldehyde and melamine-urea-formaldehyde; oleoresins; phenolic resins such as phenol-formaldehyde, phenolic-elastomer, phenolic-epoxy, phenolic-polyamide, and phenolic-vinyl acetals; polyamide polymers, such as polyamides, polyamide-epoxy and particularly long chain synthetic polymeric amides containing recurring carbonamide groups as an integral part of the main polymer chain; polyester resins such as unsaturated polyesters of dibasic acids and dihydroxy compounds, and polyester elastomer and resorcinol resins such as resorcinol-formaldehyde, resorcinol-furfural, resorcinol-phenol-formaldehyde, resorcinol-polyamide and resorcinol-urea; synthetic rubbers, including reclaimed synthetic rubbers, such as synthetic polyisoprene, chlorinated rubber, polybutadiene, cyclized rubber, butadiene-acrylonitrile rubber, butadiene-styrene rubber, and butyl rubber; neoprene rubber (polychloroprene); polysulfides (Thiokol); terpene resins; urea resins; vinyl resins such as polymers of vinyl acetal, vinyl acetate or vinyl alcohol-acetate copolymer, vinyl alcohol, vinyl chloride, vinyl butyral, vinyl chloride-acetate copolymer, vinyl pyrrolidone and vinylidene chloride copolymer; polyformaldehyde; polyphenylene oxide; polymers of diallyl phthalates and phthalates; polycarbonates of phosgene or thiophosgene and dihydroxy compounds such as bisphenols, phosgene, thermoplastic polymers of bisphenols and epichlorohydrin (tradenamed Phenoxy polymers); graft copolymers of polymers of unsaturated hydrocarbons and an unsaturated monomer, such as graft copolymers of polybutadiene, styrene and acrylonitrile, commonly called ABS resins; ABS-polyvinyl chloride polymers, recently introduced under the tradename of Cycovin; and acrylic polyvinyl chloride polymers, known by the tradename of Kydex 100.

The synthetic polymers of the invention can be used in the unfilled condition, or with fillers such as glass fiber, glass powder, glass beads, asbestos, talc and other mineral fillers, wood flour and other vegetable fillers, carbon in its various forms, dyes, pigments and the like. Additionally, these polymers can be in various physical forms, such as shaped articles, for example, moldings, sheets, rods, and the like; fibers, films and fabrics and the like.

As has been noted hereinabove, the synthetic polymer surface which is treated in accordance with the method of the present invention is non-macroporous. By this, it is meant that the synthetic polymer surface is either substantially non-porous or is substantially free of pores which are of a size substantially in excess of about 10 microns. Thus, the synthetic polymer surface which is contacted with the white phosphorus in the organic solvent is either microporous in nature or, even substantially non-porous. In this regard, it is to be noted that unlike the present commercially available processes which utilize a chemical or mechanical pretreatment of the polymer surface to make it macroporous, the method of the present invention is utilized on polymer surfaces which are non-macroporous and, hence, does not require a chemical or physical etching step in order to obtain an adherent metal deposit. Additionally, by being non-macroporous, the synthetic polymer surfaces treated by the method of the present invention are quite unlike the naturally macroporous surfaces, such as leather, textiles, feathers, and the like which have been treated in many of the old, prior art processes.

In accordance with the method of the present invention, the non-macroporous synthetic polymer surfaces are treated with elemental white posphurus, which includes the various impure or commercial grades sometimes referred to as yellow phosphorus, in a solvent, to deposit phosphorus at the polymer surface. Suitable solvents for this purpose are solvents that dissolve the elemental phosphorus and which swell the surface of the synthetic polymer without detrimentally affecting the polymer surface. Suitable solvents which may be used are the halogenated hydrocarbon solvents, including those which are perhalogenated, and aromatic hydrocarbon solvents. Exemplary of the halogenated hydrocarbon solvents which may be used are chloroform, ethylchloroform, phenylchloroform, dichloroethylene, trichloroethylene, perchloroethylene, trichloroethane, dichloropropane, ethyldibromide, ethylchlorobromide, propylene dibromide, monochlorobenzene, monochlorotoluene, and the like. Exemplary of suitable aromatic hydrocarbons are benzene, toluene, xylene, ethylbenzene, naphthalene and the like.

Typically, the concentration of the phosphorus in the organic solvent is within the range of from bout 0.0001 percent by weight of phosphorus, based on the weight of the solution, up to a saturated solution with concentrations within the range of about 0.01 to 2.0 percent being preferred. The treatment of the synthetic polymer surfaces with this phosphorus solution will typically be carried out at a temperature below both the softening point of the polymer and below the boiling point of the solvent. Typically, the treatment is carried out at temperatures within the range of about 30° to 135° Centigrade, with temperatures within the range of about 50° to 100° Centigrade being preferred. The contact time between the phosphorus solution and the synthetic polymer surface will depend in each instance, on the nature of the polymer being treated, as well as on the solvent and temperature used. Typically, however, contact times will be within the range of from about 1 second to 1 hour or more, with contact times within the range of about 1 to 10 minutes being preferred.

Although, as has been indicated hereinabove, in the method of the present invention it is not necessary to pretreat the non-macroporous synthetic polymer surfaces, as for example with a chemical or mechanical etch, to render the surface macroporous, in a most preferred embodiment of the method of the present invention it has been found to be desirable to subject the synthetic polymer substrate to an organic solvent of the type used in the phosphorus solution, prior to treating the substrate with the phosphorus solution. It has been found that in some instances, such a solvent treatment has a beneficial effect on the adhesion of the final metal plate to the polymer substrate. The organic solvent used in this treatment may suitably by any of the organic solvents used in forming the phosphorus solution, as has been indicated hereinabove. Although different solvents have been used for this solvent treatment and for making up the phosphorus solution, generally, for convenience and simplicity of operation, it is preferred that the same solvent is used in both instances. Where the solvent treatment is utilized prior to the treatment with the phosphorus solution, the solvent temperature is typically within the range of about 30° centigrade to the boiling point of the solvent and preferably within the range of about 50° to 100° centigrade. Desirably, the temperature of the solvent for this pretreatment is higher than the temperature of the phosphorus solution. Although, as with the phosphorus solution, the time of contact between the solvent and the substrate will vary, depending upon the nature of the substrate, as well as the solvent and temperatures used, contact times within the range of about 1 second to 1 hour or more are typical, with contact times of from about 1 to 15 minutes being preferred.

As a result of the treatment of the synthetic polymer substrate with the phosphorus solution, whether or not it is preceded by the treatment with the organic solvent, phosphorus is deposited at the surface of the polymer. By this, it is meant that the phosphorus can be located on the surface of the synthetic polymer, embedded in the polymer surface and can be imbeded beneath the surface of the polymer, the location of the phosphorus being somewhat dependent upon the action of the solvent on the polymer surface.

Following the treatment with the phosphorus solution, the plastic surface can be rinsed with a solvent of the nature disclosed hereinbefore, and then can be dried by merely exposing the plastic surface to the atmosphere or to non-oxidizing atmospheres such as nitrogen, carbon dioxide, and the like, or by drying the surface with radiant heaters or in a conventional oven. Drying times can vary considerably, for example, from one second to 30 minutes or more, preferably 5 seconds to 10 minutes, more preferably 0.5 to 2 minutes. The rinsing and drying steps, however, are optional.

Thereafter, the phosphorus-treated polymer surface is contacted with a solution of a metal salt or a complex of a metal salt, which is capable of reacting with the phosphorus to form a metal phosphide. The metals generally employed are those of Groups IB, IIB, IVB, VB, VIB, and VIII of the Periodic Table. The preferred metals are copper, silver, gold, chromium, manganese, cobalt, nickel, palladium, titanium, zirconium, vanadium, tantalum, cadmium, tungsten, molybdenum, and the like.

The metal salts that are used in the invention can contain a wide variety of anions. Suitable anions include the anions of mineral acids such as sulfate, chloride, bromide, iodide, fluoride, nitrate, phosphate, chlorate, perchlorate, borate, carbonate, cyanide, and the like. Also useful are the anions of organic acids such as formate, acetate, citrate, butyrate, valerate, caproate, heptylate, caprylate, naphthenate, 2-ethyl caproate, cinnamate, stearate, oleate, palmitate, dimethylglyoxime, and the like. Generally the anions of organic acids contain one to 18 carbon atoms. Exemplary of metal salts which are particularly useful are copper sulfate, copper chloride, silver nitrate and nickel cyanide.

The metal salts can be complexed with a complexing agent that produces a solution having a basic pH ($>7$). Particularly useful are the ammonical complexes of the metal salts, in which one to six ammonia molecules are complexed with the foregoing metal salts. Typical examples include $NiSO_4 \cdot 6NH_3$, $NiCl_2 \cdot 6NH_3$, $Ni(C_2H_3OO)_2 \cdot 6NH_3$, $CuSo_4 \cdot 6NH_3$, $CuCl_2 \cdot 6NH_3$, $AgNO_3 \cdot 6NH_3$, $NiSO_4 \cdot 3NH_3$, $CuSO_4 \cdot 4NH_3$, $Ni(NO_3)_2 \cdot 4NH_3$, and the like. Other useful complexing agents include quinoline, amines and pyridine. Useful complexes include compounds of the formula $MX_2Q_2$ wherein M is the metal ions, X is chlorine or bromine and Q is quinoline. Typical examples include: $CoCl_2Q_2$, $CoBr_2Q_2$, $NiCl_2Q_2$, $NiI_2Q_2$, $MnCl_2Q_2$, $CuCl_2Q_2$, $CuBr_2Q_2$ and $ZnCl_2Q_2$. Also useful are the corresponding monoquinoline complexes such as $CoCl_2Q$. Useful amine complexes include the mono-(ethylene diamine)-, bis-(ethylenediamine)-, tris-(ethylenediamine)-, bis-(1,2-propane diamine)-, and bis(1,3-propanediamine)- complexes of salts such as copper sulfate. Typical pyridine complexes include $NiCl_2(py)_2$ and $CuCL_2(py)_2$ where py is pyridine.

The foregoing metal salts and their complexes are used in ionic media, preferably in aqueous solutions. However, non-aqueous media can be employed such as alcohols, for example, methyl alcohol, ethyl alcohol, butyl alcohol, heptyl alcohol, decyl alcohol, and the like. Mixtures of alcohol and water can be used. Also, useful are mixtures of alcohol with other miscible solvents of the types disclosed hereinbefore. The solution concentratio is generally in the range from about 0.1 weight percent metal salt or complex based on the total weight of the solution up to a saturated solution, preferably from about one to about 10 weight percent metal salt or complex. The pH of the metal salt or complex solution is generally maintained in the range from about 7 to 14, more preferably from about 10 to about 13.

The step of contacting the phosphorus-treated synthetic polymer surface with the solution of metal salt is generally conducted at a temperature below the softening point of the polymer and below the boiling point of the solvent. Generally the temperature is in the range of about 30° to 110° centigrade, preferably from about 50° to 100° centigrade. The time of contact can vary considerably, depending on the nature of the polymer, the characteristics of the metal salts employed and the contact temperature. However, the time of contact is generally in the range of about 0.1 to 30 minutes, preferably about 5 to 10 minutes.

Depending on the conditions employed in the preceding treatment steps, the duration of the treatments, and the nature of the polymer treated, the resulting treated polymer surface may be either (1) conductive, such that the surface can be readily electroplated by conventional techniques, or (2) non-conductive. In the latter instance the treated surface contains active or catalytic sites that render the surface susceptible to further treatment by electroless plating processes that produce a conductive coating on the polymer surface. Such a conductive coating is then capable of being plated by conventional electrolytic processes.

The treated synthetic polymer surfaces that result from contacting the phosphorus-treated surface with a metal salt solution can be subjected to a process that has become known in the art as electroless plating or chemical plating. In a typical electroless plating process, a catalytic polymer surface is contacted with a solution of a metal salt under conditions in which the metallic ion of the metal salt is reduced to the metallic state and deposited on the catalytic polymer surface. The use of this process with the polymer products of this invention relies upon the catalytic metal sites deposited on the polymer surface as a result of the treatment with the solution of metal salt or complex of this invention. A suitable chemical treating bath for the deposition of a nickel coating on the catalytic polymer surface produced in accordance with the process of the invention can comprise, for example, a solution of a nickel salt in an aqueous hypophosphite solution. Suitable hypophosphites include the alkali metal hypophosphites such as sodium hypophosphite and potassium hypophosphite, and the alkaline earth metal hypophosphites such as calcium hypophosphite and barium hypophosphite. Other suitable metal salts for use in the chemical treating bath include the metal salts described hereinbefore with respect to the metal salt treatment of the phosphorus-treated polymer surface of the invention. Other reducing media include formaldehyde, hydroquinone and hydrazine. Other agents, such as buffering agents, complexing agents, and other additives are included in the chemical plating solutions or baths.

The treated synthetic polymer surfaces of the invention that are conductive can be electroplated by the processes known in the art. The polymer article is generally used as the cathode. The metal desired to be plated is generally dissolved in an aqueous plating bath, although other media can be employed. Generally, a soluble metal anode of the metal to be plated can be employed. In some instances, however, a carbon anode or other inert anode is used. Suitable metals, solutions and condition for electroplating are described in Metal Finishing Guidebook Directory for 1967, published by Metals and Plastics Publications, Inc., Westwood, N.J.

In order that those skilled in the art may better understand the present invention and the manner in which it may be practiced, the following specific examples are given. In these examples, unless otherwise indicated, temperatures are in degrees centigrade and parts and percent are by weight. It is to be understood, however, that these examples are merely exemplary of the present invention and are not to be taken as a limitation thereof.

EXAMPLE 1

A specimen of polyethylene was immersed in a solution of yellow phosphorus dissolved in trichloroethylene for 1 minute. The resulting phosphorus-treated polyethylene specimen was thereafter immersed in an aqueous solution of copper sulfate for several minutes. The treated polyethylene specimen was washed with water, wiped dry and then dried with hot air. The resulting film of copper phosphide was found to be conductive.

EXAMPLES 2 to 5

Specimens of polypropylene were immersed for 2 minutes in a soltuion of yellow phosphorus dissolved in benzene. The phosphorus solution was maintained at a temperature of 81°C. The resulting phosphorus-treated polypropylene specimens were thereafter immersed in solutions of nickel sulfate that have been complexed with ammonia. The concentration of the solutions, the contact temperatures and times and the characteristics of the resulting nickel phosphide films on the polypropylene specimens are shown in the following Table:

Several of the treated polymer specimens were electroplated by employing the specimen as the cathode in a nickel chloride electroplating solution for 30 minutes, equivalent to a current density of 50 amperes per square foot. The electroplated specimen of polyvinylchloride produced in Example 8 was subjected to a thermocycle test which consisted of immersing the plastic for one minute in water at 50° to 55°C, followed by immersing in crushed dry ice at −70°C for 1 minute. The specimen was put through 8 successive cycles and no cracking was observed in the nickel plated film.

The nickel plated specimen of polyethylene prepared in Example 10 was subjected to 5 of the foregoing thermocycles. No cracking was observed in the nickel plated film. Thereafter a thermocycled specimen was subjected to a peel test in which it was observed that a force of 300 grams was required to pull a half inch wide strip of the metal away from the plastic surface. This corresponded to a peel strength of 1.3 pounds per inch wide strip.

The nickel plated polypropylene specimen prepared in Example 12 was subjected to a peel test in which it was observed that a force of 1300 grams were required

TABLE I

| Example | NiSO$_4$ solution (parts by weight) | | | Solution temperature (° C.) | Contact time (minutes) | Film characteristics | |
|---|---|---|---|---|---|---|---|
| | Water | NiSO$_4$ | NH$_4$OH | | | Conductive* | Appearance |
| 2 | 40 | 0.8 | 0.9 | 96 | 10 | Yes | Semi-metallic black. |
| 3 | 40 | 4 | 1.8 | 95–97 | 7 | Yes | Do. |
| 4 | 40 | 8 | 5 | 95 | 10 | Yes | Do. |
| 5 | 40 | 8 | 5 | 95 | 5 | Yes | Do. |

*Conductivity was determined in the examples of this specification by contacting the polymer surface with two pointed electrodes spaced apart by 0.25 inch and connected to a battery operated ohmmeter.

EXAMPLES 6 to 12

Specimens of polyvinylchloride, polyethylene and polypropylene were treated with solutions of phosphorus dissolved in several different solvents. Upon removal of the polymer specimens from the phosphorus solutions, the specimens were dipped into a bath of the same solvent for 3 seconds. The solvent was then permitted to evaporate from the polymer specimen. Then, the polymer specimens were immersed in ammonical solutions of nickel sulfate. In each case the condition of the surface was observed.

The various polymers and solvents employed, the temperature of the phosphorus solution, the time of contact of the polymer with the phosphorus solution and with the nickel sulfate solution, and the condition of the resulting film produced at the surface of the polymer are shown in Table 11.

to pull a half inch wide strip of metal away from the plastic surface. This corresponds to a peel strength of 5.7 pounds per inch.

EXAMPLE 13

A sheet of polyethylene was first treated with a solution of yellow phosphorus dissolved in trichloroethylene at 55° C for 2 minutes, air dried for 15 seconds at room temperature, and then placed in a 10% NiSo$_4$ solution, made strongly basic with NH$_4$OH, for 10 minutes at 90°C.

The thus treated polyethylene sheet was electroplated with copper by using the polymer sheet as the cathode in a copper plating bath consisting of copper sulfate, sulfuric acid and hydrochloric acid. A current density of 20 amperes per square foot was employed for a period of 30 minutes. After about 0.5 mil of copper had been deposited, the plated polyethylene sheet

TABLE II

| Example | Plastic | Solvent for phosphorus | Phosphorus solution temperature (° C.) | Time in phosphorus solution (minutes) | Time in nickel sulfate solution (minutes) | Condition of treated polymer surface |
|---|---|---|---|---|---|---|
| 6 | Polyvinyl chloride | Chloroform | 55 | 1 | 5 | Conductive. |
| 7 | do | do | 55 | 2 | 10 | Do. |
| 8 | do | Benzene | 55 | 2 | 10. | Do. |
| 9 | do | Methyl chloroform | 74 | 2 | 10 | Do. |
| 10 | Polyethylene | Chloroform | 55 | 1 | 10 | Do. |
| 11 | do | do | 55 | 2 | 10 | Do. |
| 12 | Polypropylene | Benzene | 81 | 2 | 10 | Smooth, shiny, conductive metallic finish. | was then placed in a nickel plating bath as the cathode and a current density of 20 amperes per square foot was employed for 30 minutes to deposit a film of about 0.5 mil of nickel. The composite copper-nickel plate was found to have a peel strength of about 8 pounds per inch.

EXAMPLE 14

A sheet of polyvinylchloride was treated by placing it in a trichloroethylene solution of yellow phosphorus at 55°C for 0.5 minute, air drying for 15 seconds at room temperature, and then placing the sheet in a 10 percent nickel acetate solution, made to a pH of 13 with ammonium hydroxide, for 10 minutes at 60°C.

The thus treated polyvinylchloride sheet was plated with copper for 45 minutes using the procedure of Example 15 to deposit about 0.75 mil of copper and thereafter was plated with nickel for about 30 minutes using the procedure in Example 15 to deposit 0.5 mil of nickel. The peel strength of the resulting copper-nickel plate was determined to be 10.5 pounds per inch.

EXAMPLES 15 to 51

In these examples, various synthetic polymers were treated with yellow phosphorus solutions containing a variety of solvents. The phosphorus-treated polymer specimens were then treated with an aqueous ammoniacal salt solution for 10 minutes, and were then electroplated with nickel using the conventional Watts nickel plating process. The peel strength of the resulting nickel plated film was determined. Table III enumerates the polymer employed, the solvent for the phosphorus, the phosphorus solution temperature and time of contact with the polymer. In Examples 31 and 38 to 40, an ammonical solution of nickel acetate was employed for the second treating step. An ammonical solution of nickel sulfate was used in all other examples. These polymer surfaces were subjected to electroless plating. The peel strengths for the electroplated polymer articles are shown in Table III, except as noted for Examples 38 to 41.

EXAMPLES 42 and 43

In Example 42, polypropylene was treated with a saturated solution of phosphorus in trichloroethylene, and in Example 43, polypropylene was treated with a solution of phosphorus in trichloroethylene that was 50 percent saturated. In both examples, the polypropylene was treated with the phosphorus solution at 80°—85°C for 2 minutes, dried and then dipped in an ammonical solution of nickel sulfate at 90°C for 10 minutes. The treated polymers were electroplated in a Watts nickel bath using a current density of 50 amperes per square foot for 30 minutes in Example 42, 40 minutes in Example 43. The peel strengths for the resulting nickel plated films were found to be 14.1 pounds per inch (Example 42) and 17.6 pounds per inch (Example 43).

EXAMPLE 44 to 54

In Examples 44 to 53, polyethylene specimens were treated with a saturated solution of yellow phosphorus in trichloroethylene at temperatures in the range of 56° to 65°C for 1 to 7 minutes. In Example 54, a specimen of polyvinylchloride containing 10 per cent polyvinylacetate was similarly treated with a solution of yellow phosphorus in benzene. The resulting phosphorus treated polymer specimens were treated with various aqueous ammonical solutions of nickel salts and thereafter were electroplated with nickel using the conventional Watts nickel plating process. Table IV enumerates the metal salts employed, the salt solution temperature, time of contact of the polymer in the salt solution, and the peel strength of the nickel plated film.

TABLE IV

| Example | Nickel Salt | Salt Solution Temp.°C. | Contact Time minutes | Plated Film Characteristics |
|---|---|---|---|---|
| 44 | Acetate | 70 | 4 | 14* |
| 45 | Nitrate | 80 | 6 | 4.9* |
| 46 | Carbonate | 70 | 10 | Black conductive deposit, electroplated |
| 47 | Iodide | 73 | 3 | Black conductive deposit, electroplated |
| 48 | Chloride | 70 | 5 | 24* |
| 49 | Bromide | 70 | 5 | 19.5* |
| 50 | Cyanide | 72 | 5 | Black conductive deposit |

TABLE III

| Example | Polymer | Solvent for phosphorus | Phosphorus solution temperature, °C. | Contact time, minutes | Peel strength, pounds/inch |
|---|---|---|---|---|---|
| 15 | Polypropylene | Trichloroethylene | 86 | 2 | 24.6 |
| 16 | do | Benzene | 81 | 2 | 30.0 |
| 17 | Polyethylene (high density) | Trichloroethylene | 85 | 5 | 46.3 |
| 18 | do | Perchloroethylene | 118 | 10 | 9.4 |
| 19 | do | Benzene | 81 | 2 | 39.0 |
| 20 | do | Chloroform | 53 | 2 | 5.3 |
| 21 | Polyethylene (low density) | Monochlorobenzene | 55 | 2 | 8.6 |
| 22 | Polystyrene | Benzene | 81 | 2 | 1.6 |
| 23 | Polyvinylchloride | Trichloroethylene | 55 | 0.5 | 47.5 |
| 24 | do | Perchloroethylene | 121 | 1 | 35.0 |
| 25 | do | Benzene | 53 | 2 | 41.0 |
| 26 | do | Monochlorobenzene | 53 | 2 | 14.1 |
| 27 | do | Chloroform | 53 | 2 | 5.3 |
| 28 | do | Methylchloroform | 74 | 2 | 3.0 |
| 29 | Polyvinylchloride with 10% polyvinylacetate | Perchloroethylene | 53 | 2 | 42.0 |
| 30 | do | Benzene | 53 | 1 | 38.7 |
| 31 | Acrylic-polyvinyl-chloride polymer | Trichloroethylene | 50–55 | 2 | 16.9 |
| 32 | ABS resin | do | 50–60 | 0.05 | 5.9 |
| 33 | Polycarbonate | do | 87 | 0.5 | 1.6 |
| 34 | Polystyrene-acrylonitrile | Benzene | 53 | 0.083 | 7.4 |
| 35 | Polymethyl-methacrylate | Methyl chloroform | 74 | 5 | 9.4 |
| 36 | do | Monochlorobenzene | 73 | 5 | 2.8 |
| 37 | Polyphenylene oxide | Trichloroethylene | 45 | 0.033 | 3.1 |
| 38 | Tygon tubing | do | 50 | 0.05 | (*) |
| 39 | Acetate rayon cloth | do | 60–73 | 10 | (*) |
| 40 | Nylon cloth | do | 60 | 5 | (*) |
| 41 | Saran cloth | do | 60 | 5 | (*) |

*Peel tests could not be run on the tubing and cloth, but plated metal films were very adherent.

| | | | | |
|---|---|---|---|---|
| 51 | Citrate | 75 | 5 | Black conductive deposit, electroplated. |
| 52 | Perchlorate | 85 | 5 | Black conductive deposit, electroplated |
| 53 | Dimethylglyoxime | | 10 | Black conductive deposit, electroplated |
| 54 | Formate | 70 | 5 | 21* |

*Peel strength in pounds per inch.

EXAMPLES 55 to 60

In Examples 55 to 60, polyethylene specimens were treated with saturated solutions of yellow phosphorus in trichloroethylene at 60°C for 2 minutes. Then the phosphorus treated polymers were contacted with aqueous solutions of metal salts that had been complexed with various pyridines, amines and quinoline. The latter treatment steps resulted in the production of conductive films on the polymer surfaces. In Example 60 a nickel phosphide deposit was produced which catalyzed the deposition of nickel from an electroless plating bath. Table V enumerates the metal salts, complexing agents, salt solution temperatures and contact times.

TABLE V

| Example | Nickel Salt | Complexing Agent | Salt Solution Temp.°C. | Contact Time |
|---|---|---|---|---|
| 55 | Acetate | Pyridine | 92 | 35 |
| 56 | Acetate | Lauryl pyridinium chloride | 92 | 60 |
| 57 | Acetate | Pyridine and Ammonia | 90 | 30 |
| 58 | Acetate | Lauryl pyridinium chloride and Ammonia | 90 | 70 |
| 59 | Chloride | Ethylene diamine | 90 | 10 |
| 60 | Chloride | Quinoline-formed in aqueous ethanol solution | 90 | 5 |

EXAMPLE 61

A phenol formaldehyde resinous article was pretreated by exposure to sodium hydroxide for 12 minutes at 90°C. The article was then treated with a saturated solution of yellow phosphorus in trichloroethylene at about 60°C for several minutes, and thereafter with an aqueous, ammonical solution of nickel sulfate at 80°C for 5 minutes. The resultant treated surfaces contained a catalytic deposit of nickel phosphide. The polymer article was then subjected to the electroless nickel plating step of the MACuplex process of the MacDermid Company. The thus produced nickel film was conductive. The polymer article was electroplated using the conventional Watts nickel plating process.

EXAMPLE 62

Polypropylene samples were immersed in a bath containing trichloroethylene for the time period and temperature specified below. Thereafter the samples were immersed in a 0.5 percent solution of phosphorus in trichloroethylene at 30° centigrade for 2 minutes and then into a layer of water which was maintained on the surface of the phosphorus solution, for 2.5 minutes at 30° centigrade. The samples were immersed in a bath containing $NiCl_2$, ethylene diamine and caustic for 15 minutes at 70° centigrade, washed with water at 55° centigrade for 5 minutes and dried at 85° centigrade for 20 minutes. Transfer time between each bath was one minute. The samples were thereafter electroplated with 3±½ mils of Watts nickel and the adhesion determined. The time the sample was immersed in the trichloroethylene bath, the temperature of the bath, and the average resulting adhesion are given in Table VII.

TABLE VII

| Time, minutes | Temperature, C° | Peel Strength lb/inch |
|---|---|---|
| 2 | 30 | 9.3 |
| 4 | 30 | 7.5 |
| 2 | 40 | 12.1 |
| 4 | 40 | 12.1 |
| 2 | 50 | 19.4 |
| 2 | 60 | 25.6 |
| 4 | 60 | 24.6 |
| 2 | 65 | 32.0 |
| 4 | 65 | 29.9 |

The foregoing table demonstrates the effect of the temperature of the solvent pre-treatment bath on the final adhesion of the metal plating to the substrate.

EXAMPLE 63

Example 62 was repeated except that the solvent employed for the pretreatment was perchloroethylene.

EXAMPLE 64

Example 62 was repeated except that the solvent employed for the pretreatment was benzene.

In the manner employed in Examples 62—64, the methods of the preceding Examples 1–61 can be similarly modified by adding a solvent pre-treatment prior to the treatment with phosphorus-organic solvent solution.

Various changes and modifications can be made in the process and products of this invention without departing from the spirit and scope of the invention. The various embodiments of the invention disclosed herein serve to further illustrate the invention but are not intended to limit it.

What is claimed is:

1. A process for the treatment of a synthetic polymer surface which comprises contacting a non-macroporous synthetic polymer surface with white phosphorus in at least one organic solvent selected from chloroform, ethylchloroform, phenylchloroform, dichloroethylene, trichloroethylene, perchloroethylene, trichloroethane, dichloropropane, ethyldibromide, ethylchlorobromide, propylenedibromide, monochlorobenzene, monochlorotoluene, benzene, toluene, xylene, ethylbenzene, and naphthalene, swelling the surface of the polymer without detrimetally effecting it, depositing phosphorus at said polymer surface, contacting the thus-treated surface with a solution consisting essentially of a metal salt or metal salt complex so as to form a metal phosphide, wherein said metal is selected from groups IB, IIB, IVB, VB, VIB, VIIB, and VIII of the Periodic Table, and thereafter, electroplating the resulting surface to deposit an adherent metal coating on the treated polymer surface.

2. The process as claimed in claim 1 wherein the solution with which the phosphorus treated surface is contacted is a solution of a metal salt complex in which the complex is selected from ammonia, amines, quinolines and pyridines.

3. The process as claimed in claim 2 wherein the metal of the metal salt complex is selected from nickel, copper and silver.

4. The process as claimed in claim 3 wherein the metal salt complex is an ethylene diamine complex of nickel chloride.

5. The process as claimed in claim 4 wherein following the treatment of the phosphorus treated surface with the metal salt or salt complex solution, the thus-treated surface is subjected to electroless metal plating to deposit an electroless conductive coating on the treated polymer, prior to electroplating.

6. The process as claimed in claim 3 wherein following the treatment of the phosphorus treated surface with the metal salt or salt complex solution, the thus-treated surface is subjected to electroless metal plating to deposit an electroless conductive coating on the treated polymer, prior to electroplating.

7. The process as claimed in claim 2 wherein following the treatment of the phosphorus treated surface with the metal salt or salt complex solution, the thus-treated surface is subjected to electroless metal plating to deposit an electroless conductive coating on the treated polymer, prior to electroplating.

8. The process as claimed in claim 1 wherein following the treatment of the phosphorus treated surface with the metal salt or salt complex solution, the thus-treated surface is subjected to electroless metal plating to deposit an electroless conductive coating on the treated polymer, prior to electroplating.

9. The process as claimed in claim 8 wherein the non-macroporous synthetic polymer treated is selected from polymers of unsaturated hydrocarbons, polyindene, indenecoumarone resins, polymers of acrylate and methacrylate esters, acrylate and methacrylate resins, alkyd resins, cellulose derivatives, epoxy resins, furan resins, hydrocarbon resins from petroleum, isobutylene resins, polyurethanes, melamine resins, oleo resins, phenolic resins, polyamide polymers, polyester resins, resorcinol resins, rubbers, polysulfides, terpene resins, urea resins, vinyl resins, polyformaldehyde, polyphenylene oxide, phthalate polymers, polymers of bisphenols and epichlorohydrin, polycarbonates, graft copolymers of polymers of unsaturated hydrocarbons and an unsaturated monomer, ABS-polyvinylchloride polymers and acrylic polyvinylchloride polymers.

10. A synthetic polymer article having an adherent electrolytically deposited metal coating produced in accordance with the process of Claim 9.

11. The process as claimed in claim 1 wherein prior to contacting the non-macroporous synthetic polymer surface with the organic solvent solution of white phosphorus, the polymer surface is pretreated with an organic solvent selected from halogenated hydrocarbon and aromatic hydrocarbon solvents.

12. The process as claimed in claim 11 wherein following the treatment of the phosphorus treated surface with the metal salt or salt complex solution, the thus-treated surface is subjected to electroless metal plating to deposit an electroless conductive coating on the treated polymer, prior to electroplating.

13. The process as claimed in claim 1 wherein the non-macroporous synthetic polymer treated is selected from polymers of unsaturated hydrocarbons, polyindene, indenecoumarone resins, polymers of acrylate and methacrylate esters, acrylate and methacrylate resins, alkyd resins, cellulose derivatives, epoxy resins, furan resins, hydrocarbon resins from petroleum, isobutylene resins, polyurethanes, melamine resins, oleo resins, phenolic resins, polyamide polymers, polyester resins, resorcinol resins, synthetic rubbers, polysulfides, terpene resins, urea resins, vinyl resins, polyformaldehyde, polyphenylene oxide, phthalate polymers, polymers of bisphenols and epichlorohydrin, polycarbonates, graft copolymers of polymers of unsaturated hydrocarbons and an unsaturated monomer, ABS-polyvinyl chloride polymers and acrylic polyvinylchloride polymers.

14. A synthetic polymer article having an adherent electrolytically deposited metal coating produced in accordance with the process of claim 13.

15. The process as claimed in claim 1 wherein the solution with which the phosphorus-treated surface is contacted is a solution of a metal salt in which the metal is selected from nickel, copper and silver.

16. The process as claimed in claim 15 wherein following the treatment of the phosphorus treated surface with the metal salt or salt complex solution, the thus-treated surface is subjected to electroless metal plating to deposit an electroless conductive coating on the treated polymer, prior to electroplating.

17. The process as claimed in claim 1 wherein the solvent is benzene.

18. The process as claimed in claim 17 wherein following the treatment of the phosphorus treated surface with the metal salt or salt complex solution, the thus-treated surface is subjected to electroless metal plating to deposit an electroless conductive coating on the treated polymer, prior to electroplating.

19. The process as claimed in claim 1 wherein the solvent is perchloroethylene.

20. The process as claimed in claim 19 wherein following the treatment of the phosphorus treated surface with the metal salt or salt complex solution, the thus-treated surface is subjected to electroless metal plating to deposit an electroless conductive coating on the treated polymer, prior to electroplating.

21. The process as claimed in claim 1 wherein the solvent is trichloroethylene.

22. The process as claimed in claim 13 wherein following the treatment of the phosphorus treated surface with the metal salt or salt complex solution, the thus-treated surface is subjected to electroless metal plating to deposit an electroless conductive coating on the treated polymer, prior to electroplating.

* * * * *